US011128876B2

(12) United States Patent
Chao et al.

(10) Patent No.: US 11,128,876 B2
(45) Date of Patent: Sep. 21, 2021

(54) JOINT COEFFICIENT CODING OF TRANSFORM SKIP AND BDPCM MODE FOR 4:4:4 COLOR FORMATS

(71) Applicant: QUALCOMM Incorporated, San Diego, CA (US)

(72) Inventors: Yung-Hsuan Chao, San Diego, CA (US); Muhammed Zeyd Coban, Carlsbad, CA (US); Hongtao Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/816,107

(22) Filed: Mar. 11, 2020

(65) Prior Publication Data

US 2020/0296390 A1 Sep. 17, 2020

Related U.S. Application Data

(60) Provisional application No. 62/817,480, filed on Mar. 12, 2019.

(51) Int. Cl.
*H04N 19/186* (2014.01)
*H04N 19/176* (2014.01)
(Continued)

(52) U.S. Cl.
CPC ......... *H04N 19/186* (2014.11); *H04N 19/176* (2014.11); *H04N 19/50* (2014.11); *H04N 19/61* (2014.11); *H04N 19/70* (2014.11)

(58) Field of Classification Search
CPC .... H04N 19/132; H04N 19/176; H04N 19/18; H04N 19/186; H04N 19/50; H04N 19/61; H04N 19/70
See application file for complete search history.

(56) References Cited

U.S. PATENT DOCUMENTS

| 2013/0107970 A1* | 5/2013 | Wang | H04N 19/186 |
| | | | 375/240.18 |
| 2013/0188731 A1* | 7/2013 | Kim | H04N 19/64 |
| | | | 375/240.18 |

(Continued)

OTHER PUBLICATIONS

Abdoli M., et al., "AHG11: Block DPCM for Screen Content Coding," Document: JVET-L0078, Joint Video Experts Team (JVET) of ITU-T SG 16 WP 3 and ISO/IEC JTC 1/SC 29/WG 11, 12th Meeting: Macao, CN, Oct. 3-12, 2018, JVET-L0078-v2, pp. 1-7.

(Continued)

*Primary Examiner* — James T Boylan
(74) *Attorney, Agent, or Firm* — Shumaker & Sieffert, P.A.

(57) ABSTRACT

A video decoder configured to receive a first syntax element indicating if any coding group (CG) of a plurality of CGs includes at least one non-zero coefficient, wherein the plurality of CGs includes a luma CG and at least one chroma CG; in response to the first syntax element indicating that a CG of a plurality of CGs includes at least one non-zero coefficient, receive, for each CG of the plurality of CGs, a flag indicating if a corresponding CG of the plurality of CGs includes at least one non-zero coefficient; and for a CG with a corresponding flag indicating that the CG includes at least one non-zero coefficient, receive additional syntax indicating values for coefficients of the CG.

27 Claims, 13 Drawing Sheets

(51) Int. Cl.
*H04N 19/61* (2014.01)
*H04N 19/50* (2014.01)
*H04N 19/70* (2014.01)

(56) References Cited

U.S. PATENT DOCUMENTS

2020/0260070 A1* 8/2020 Yoo ................ H04N 19/103
2020/0389667 A1* 12/2020 Zhao ................ H04N 19/96

OTHER PUBLICATIONS

Abdoli M., et al., "CE8: BDPCM with Horizontal/vertical Predictor and Independently Decodable Areas (test 8.3.1b)," Joint Video Experts Team (JVET) of ITU-T SG 16 WP 3 and ISO/IEC JTC 1/SC 291WG 11, 13th Meeting: Marrakech, MA, Jan. 9-18, 2019, Document: JVET-M0057, pp. 1-7.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "Non-CE8: Unified Transform Type Signalling and Residual Coding for Transform Skip," Joint Video Experts Team (JVET) of ITU-T SG 16 WP 3 and ISO/IEC JTC 1/SC 29/WG 11, JVET-M0464-v4, 13th Meeting, Jan. 9-18, 2019, 13 pages.

Bross B., et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.

Bross B., et al., "Versatile Video Coding (Draft 8)," Joint Video Experts Team (JVET) of ITU-T SG 16 WP 3 and ISO/IEC JTC 1/SC 29/WG 11, 17th Meeting: Brussels, BE, 7-17 Jan. 2020, JVET-Q2001-vD, 514 Pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.

Ergen S., ZigBee/IEEE 802.15.4 Summary ,, Sep. 10, 2004, 37 Pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band," LAN/MAN Standards Committee of the IEEE Computer Society, Dec. 28, 2012, 628 Pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.

Schwarz (Fraunhofer) H., et al., "CE7: Transform Coefficient Coding with Reduced Number of Regular-coded Bins (tests 7.1.3a, 7.1.3b)," Joint Video Experts Team (JVET) of ITU-TSG 16 WP 3 and ISO/IEC JTC 1/SC 29/WG 11 JVET-L0274-v3, 12th Meeting: Macao, CN, XP030194470, Oct. 3, 2018-Oct. 12, 2018, Oct. 3-12, 2018, 19 pages, Retrieved from the Internet: URL: http://phenix.int-evry.fr/jvet/doc_end_user/documents/12_Macao/wg11/JVET-L0274-v3.zip.

* cited by examiner

JOINT COEFFICIENT CODING OF TRANSFORM SKIP AND BDPCM MODE FOR 4:4:4 COLOR FORMATS

This Application claims the benefit of U.S. Provisional Patent Application 62/817,480, filed 12 Mar. 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes predictive coefficient coding techniques that include coding a syntax element for a residual block that indicates if at least one of a first chroma coding group, a second chroma coding group, or a luma coding group of the residual block includes at least one non-zero coefficient. For ease of explanation, this syntax element may be referred to herein as a joint significance flag. If the joint significance flag indicates that at least one of the first chroma coding group, the second chroma coding group, or the luma coding group of the residual block includes at least one non-zero coefficient, then additional, separate significance flags may be sent for each of the first chroma coding group, the second chroma coding group, or the luma coding group to indicate if the corresponding coding group has at least one non-zero coefficient. If the joint significance flag indicates that none of the first chroma coding group, the second chroma coding group, or the luma coding group of the residual block includes at least one non-zero coefficient, then the additional, separate significance flags are not coded.

In most coding scenarios, the coefficient values in chroma coding groups are not all that well correlated with the coefficient values in luma coding groups, and as such, a joint significance flag would increase signaling overhead. This disclosure, however, describes using a joint significance flag for some coding scenarios, such as when blocks in a 4:4:4 color format are coded in a transform skip mode, where a joint significance flag may reduce signaling overhead, and therefore, improve overall coding efficiency.

According to one example, a method of decoding video data includes determining a predictive block for a current block of the video data; determining a residual block for the current block, wherein determining the residual block for the current block comprises: receiving a first syntax element indicating if at least one of a first chroma coding group (CG), a second chroma CG, or a luma CG of the residual block includes at least one non-zero coefficient; in response to the first syntax element indicating that at least one of the first chroma CG, the second chroma CG, or the luma CG includes at least one non-zero coefficient, receiving a first flag indicating if the first chroma CG includes at least one non-zero coefficient, a second flag indicating if the second chroma CG includes at least one non-zero coefficient, and a third flag indicating if the luma CG includes at least one non-zero coefficient; for at least one of the first chroma CG, the second chroma CG, or the luma CG having at least one non-zero coefficient, receiving additional syntax indicating values for coefficients of the at least one of the first chroma CG, the second chroma CG, or the luma CG having the at least one non-zero coefficient; and determining the residual block based on the values for the coefficients; and adding the predictive block to the residual block to determine a reconstructed block for the current block.

According to another example, a device for decoding video data, the device comprising:
a memory configured to store video data and one or more processors implemented in circuitry and configured to: determine a predictive block for a current block of the video data; determine a residual block for the current block, wherein to determine the residual block for the current block, the one or more processors are configured to: receive a first syntax element indicating if at least one of a first chroma coding group (CG), a second chroma CG, or a luma CG of the residual block includes at least one non-zero coefficient; in response to the first syntax element indicating that at least one of the first chroma CG, the second chroma CG, or the luma CG includes at least one non-zero coefficient, receive a first flag indicating if the first chroma CG includes at least one non-zero coefficient, a second flag indicating if the second chroma CG includes at least one non-zero coefficient, and a third flag indicating if the luma CG includes at least one non-zero coefficient; and for at least one of the first chroma CG, the second chroma CG, or the luma CG having at least one non-zero coefficient, receive additional syntax indicating values for coefficients of the at least one of the first chroma CG, the second chroma CG, or the luma CG having the at least one non-zero coefficient; determine the residual block based on the values for the coefficients; and add the predictive block to the residual block to determine a reconstructed block for the current block.

According to another example, a computer readable storage medium stores instructions that when executed by one or more processors cause the one or more processors to:

determine a predictive block for a current block of the video data; determine a residual block for the current block, wherein to determine the residual block for the current block, the instructions cause the one or more processors to: receive a first syntax element indicating if at least one of a first chroma coding group (CG), a second chroma CG, or a luma CG of the residual block includes at least one non-zero coefficient; in response to the first syntax element indicating that at least one of the first chroma CG, the second chroma CG, or the luma CG includes at least one non-zero coefficient, receive a first flag indicating if the first chroma CG includes at least one non-zero coefficient, a second flag indicating if the second chroma CG includes at least one non-zero coefficient, and a third flag indicating if the luma CG includes at least one non-zero coefficient; and for at least one of the first chroma CG, the second chroma CG, or the luma CG having at least one non-zero coefficient, receive additional syntax indicating values for coefficients of the at least one of the first chroma CG, the second chroma CG, or the luma CG having the at least one non-zero coefficient; and determine the residual block based on the values for the coefficients; and add the predictive block to the residual block to determine a reconstructed block for the current block.

According to another example, and apparatus for decoding video data includes means for determining a predictive block for a current block of the video data; means for determining a residual block for the current block, wherein the means for determining the residual block for the current block comprises: means for receiving a first syntax element indicating if at least one of a first chroma coding group (CG), a second chroma CG, or a luma CG of the residual block includes at least one non-zero coefficient; means for receiving, in response to the first syntax element indicating that at least one of the first chroma CG, the second chroma CG, or the luma CG includes at least one non-zero coefficient, a first flag indicating if the first chroma CG includes at least one non-zero coefficient, a second flag indicating if the second chroma CG includes at least one non-zero coefficient, and a third flag indicating if the luma CG includes at least one non-zero coefficient; means for receiving, for at least one of the first chroma CG, the second chroma CG, or the luma CG having at least one non-zero coefficient, additional syntax indicating values for coefficients of the at least one of the first chroma CG, the second chroma CG, or the luma CG having the at least one non-zero coefficient; and means for determining the residual block based on the values for the coefficients; and means for adding the predictive block to the residual block to determine a reconstructed block for the current block.

A method of encoding video data includes determining a predictive block for a current block of the video data; and determining a residual block for the current block, wherein determining the residual block for the current block comprises determining if at least one of a first chroma coding group (CG), a second chroma CG, or a luma CG of the residual block includes at least one non-zero coefficient and in response to none of the first chroma CG, the second chroma CG, or the luma CG including at least one non-zero coefficient, generating for inclusion in a bitstream of encoded video data, a syntax element indicating that none of the first chroma CG, the second chroma CG, or the luma CG include at least one non-zero coefficient.

A device for encoding video data includes a memory configured to store video data and one or more processors implemented in circuitry and configured to determine a predictive block for a current block of the video data; and determine a residual block for the current block, wherein to determine the residual block for the current block, the one or more processors are configured to determine if at least one of a first chroma coding group (CG), a second chroma CG, or a luma CG of the residual block includes at least one non-zero coefficient and in response to none of the first chroma CG, the second chroma CG, or the luma CG including at least one non-zero coefficient, generate for inclusion in a bitstream of encoded video data, a syntax element indicating that none of the first chroma CG, the second chroma CG, or the luma CG include at least one non-zero coefficient.

The details of one or more examples are set forth in the accompanying drawings and the description below. Other features, objects, and advantages will be apparent from the description, drawings, and claims.

DETAILED DESCRIPTION

Figure 1:
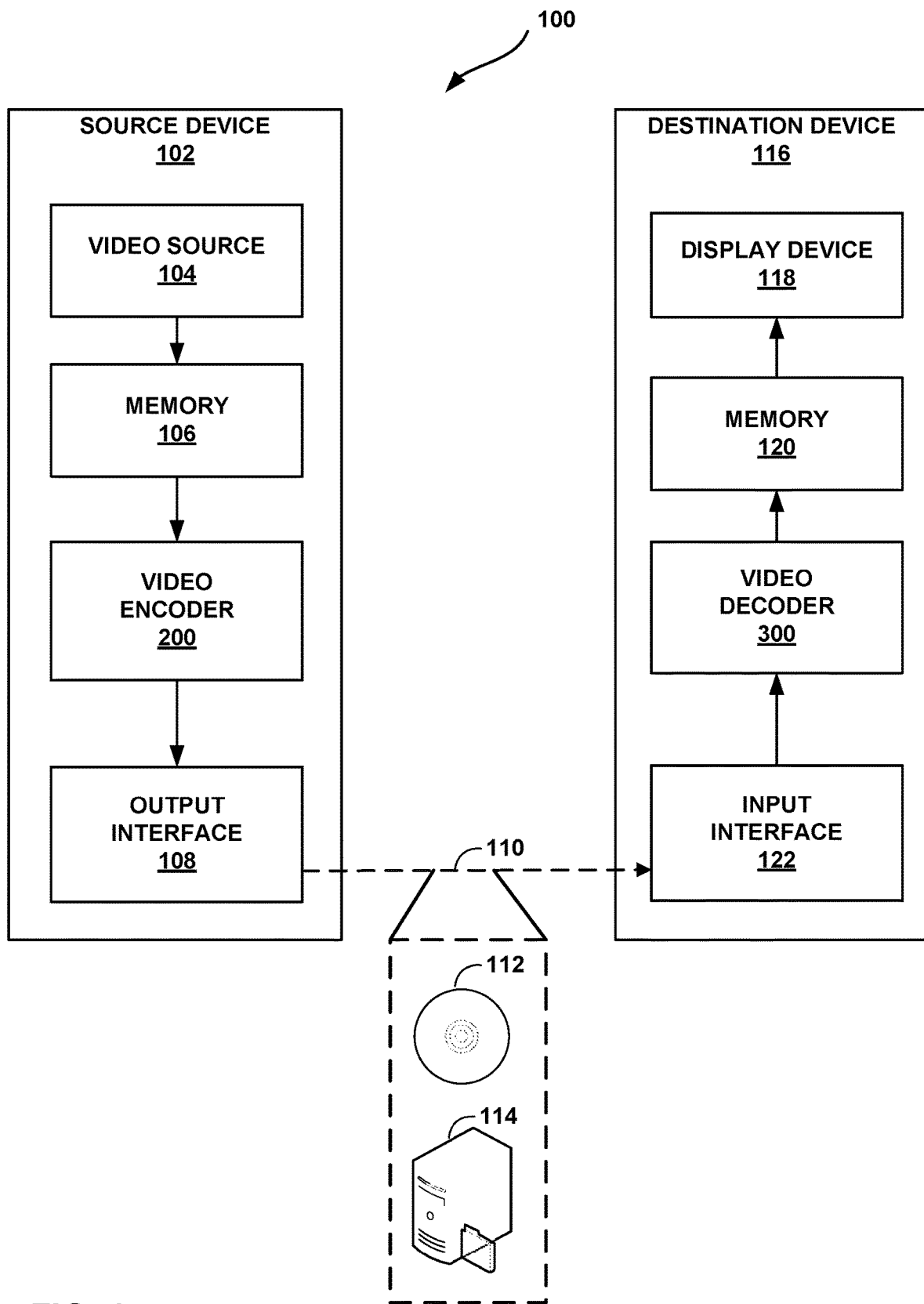
FIG. 1 is a block diagram illustrating an example video encoding and decoding system that may perform the techniques of this disclosure.

Video coding (e.g., video encoding and/or video decoding) typically involves predicting a block of video data from either already coded samples of video data in the same picture (e.g., intra prediction) or an already coded block of video data in a different picture (e.g., inter prediction). In some instances, the video encoder also calculates residual data by comparing the predictive block, also referred to as a prediction block, to the original block. Thus, the residual data represents a difference between the predictive block and the original block of video data. In some coding scenarios, to reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the predictive block to produce a reconstructed video block that matches the original video block more closely than the predictive block alone. Due to the loss introduced by the transforming and quantizing of the residual data, the reconstructed block may have distortion or artifacts. One common type of artifact or distortion is referred to as blockiness, where the boundaries of the blocks used to code the video data are visible.

To further improve the quality of decoded video, a video decoder may perform one or more filtering operations on the reconstructed video blocks. As part of performing one or more filtering operations, the video decoder may, for example, perform one or more of deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes predictive coefficient coding techniques that include coding a syntax element for a residual block that indicates if at least one of a first chroma coding group, a second chroma coding group, or a luma coding group of the residual block includes at least one non-zero coefficient. For ease of explanation, this syntax element may be referred to herein as a joint significance flag. If the joint significance flag indicates that at least one of the first chroma coding group, the second chroma coding group, or the luma coding group of the residual block includes at least one non-zero coefficient, then additional, separate significance flags may be sent for each of the first chroma coding group, the second chroma coding group, or the luma coding group to indicate if the corresponding coding group has at least one non-zero coefficient. If the joint significance flag indicates that none of the first chroma coding group, the second chroma coding group, or the luma coding group of the residual block includes at least one non-zero coefficient, then the additional, separate significance flags are not coded.

In most coding scenarios, the coefficient values in chroma coding groups are not all that well correlated with the coefficient values in luma coding groups, and as such, a joint significance flag would increase signaling overhead. This disclosure, however, describes using a joint significance flag for some coding scenarios, such as when blocks in a 4:4:4 color format are coded in a transform skip mode, where a joint significance flag may reduce signaling overhead, and therefore, improve overall coding efficiency. Instead of always sending a significance flag for each color component, for some coding scenarios a single significance may indicate that no color component for a particular coding group has a non-zero coefficient. The techniques of this disclosure may be applied to any of the existing video codecs, such as High Efficiency Video Coding (HEVC), or be coding tool to the standard currently being developed, such as Versatile Video Coding (VVC), and to other future video coding standards.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coefficient coding described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coefficient coding described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13th Meeting: Marrakech, M A, 9-18 Jan. 2019, JVET-M1001-v5 (hereinafter "VVC Draft 4"). Another draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17th Meeting: Brussels, B E, 7-17 Jan. 2020, JVET-Q2001-v14 (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC, as an example, defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

Although the above describes examples where transforms are preformed, in some examples, the transform may be skipped. For instance, video encoder 200 may implement transform skip mode in which the transform operation is skipped. In examples where transform is skipped, video encoder 200 may output coefficients corresponding to residual values instead of transform coefficients. In the following description, the term "coefficient" should be interpreted to include either coefficients corresponding to residual values or transform coefficients generated from the result of a transform.

As noted above, following any transform or where transform is skipped to produce coefficients, video encoder 200 may perform quantization of the coefficients. In some examples, quantization may also be skipped when transform is skipped. Quantization generally refers to a process in which coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the coefficients (e.g., generated from the result of the transform or due to transform skip), producing a one-dimensional vector from the two-dimensional matrix including the quantized coefficients. The scan may be designed to place higher energy (and therefore lower frequency) coefficients at the front of the vector and to place lower energy (and therefore higher frequency) coefficients at the back of the vector. In examples where transform is skipped, the result of the scan may not be that higher energy coefficients are at the front of the vector and lower energy coefficients are at the back of the vector. In some examples, video encoder 200 may utilize a predefined scan order to scan the quantized coefficients to produce a serialized vector, and then entropy encode the quantized coefficients of the vector. In other examples, video encoder 200 may perform an adaptive scan. After scanning the quantized coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

As introduced above, video encoder 200 encodes residual data in TUs. Depending on the expected characteristics of the residual data in a TU, video encoder 200 may encode TUs in different modes, such as a transform mode or a transform skip mode, with different modes utilizing different coefficient coding schemes. Some coefficient coding schemes utilize coefficient groups to encode a TU. A coefficient group generally is a subset of the coefficients in a TU. For example, video encoder 200 may encode a 16×16 TU as four 4×4 coefficient groups.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define the partitioning information of a picture into CTUs and the partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized coefficients that represent either residual values or transform coefficients. Video decoder 300 may inverse quantize and inverse transform the quantized transform coefficients of a block to reproduce a residual block for the block. In examples where video encoder 200 skipped the transform operation (e.g., transform skip mode), video decoder 300 may skip the inverse transform operation. Video decoder 300 uses a signaled prediction mode (intra- or inter-prediction) and related prediction information (e.g., motion information for inter-prediction) to form a prediction block (i.e., predictive block) for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As discussed above, in most coding scenarios, the coefficient values in chroma coding groups are not all that well correlated with the coefficient values in luma coding groups, and as such, a joint significance flag would increase signaling overhead. This disclosure, however, describes using a joint significance flag for some coding scenarios, such as when blocks in a 4:4:4 color format are coded in a transform skip mode, where a joint significance flag may reduce signaling overhead, and therefore, improve overall coding efficiency.

More specifically, video decoder 300 may be configured to determine a residual block a current block of video data by receiving a first syntax element indicating if at least one of a first chroma coding group, a second chroma coding group, or a luma coding group includes at least one non-zero coefficient. In response to the first syntax element indicating that at least one of the first chroma coding group, the second chroma coding group, or the luma coding group includes at least one non-zero coefficient, video decoder 300 may receive a first flag indicating if the first chroma CG includes at least one non-zero coefficient, a second flag indicating if the second chroma CG includes at least one non-zero coefficient, and a third flag indicating if the luma CG includes at least one non-zero coefficient. By making the signaling of the first flag, the second flag, and the third flag conditional on the value of the first syntax element, video decoder 300 may be able to determine values for residual blocks with less signaling overhead, which improves overall coding efficiency.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
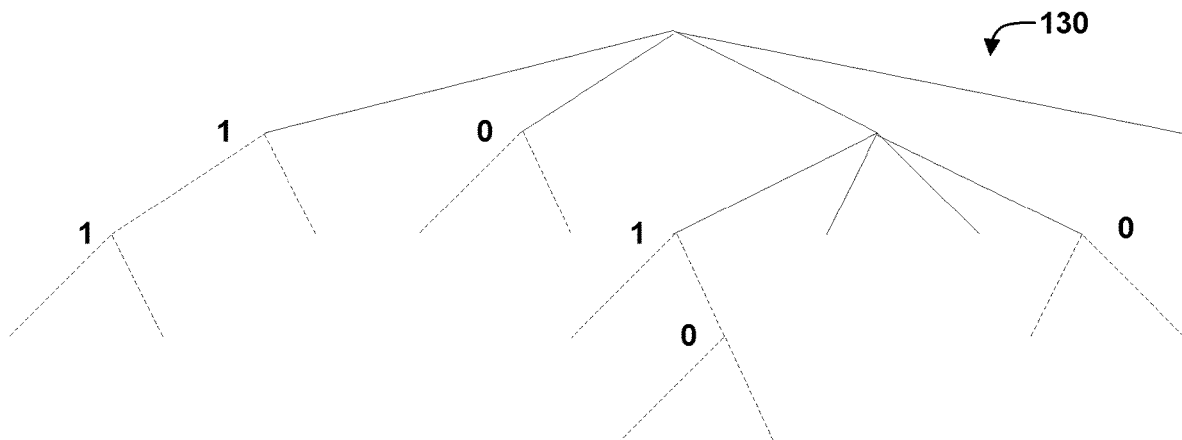
FIGS. 2A and 2B are conceptual diagrams illustrating an example quadtree binary tree (QTBT) structure, and a corresponding coding tree unit (CTU).
Figure 2B:
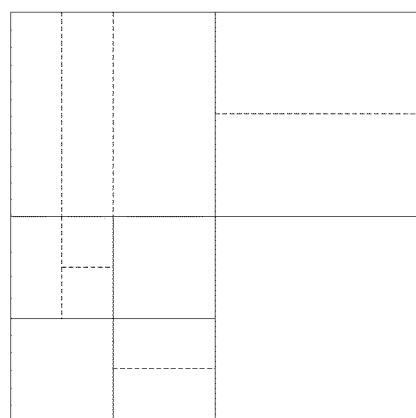

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

Trellis coded quantization (TCQ) was proposed in H. Schwarz, T. Nguyen, D. Marpe, T. Wiegand, M. Karczewicz, M. Coban, J. Dong, "CE7: Transform coefficient coding with reduced number of regular-coded bins (tests 7.1.3a, 7.1.3b)", JVET document JVET-L0274, Macao, C N, October 2018 (hereinafter JVET-L0274). In the techniques of JVET-L0274, two scalar quantizers are switchably used for quantization/dequantization. The scalar quantizer used on a current transform/quantized coefficient is determined by the parity (the least significant bit) of the quantized coefficient that precedes the current transform/quantized coefficient in the scanning order.

A coefficient coding scheme coupled with TCQ was also proposed in JVET-L0274, by which the context selection for decoding a quantized coefficient depends on the quantizer used. Specifically, the significance flag (SIG) of a coefficient indicating the coefficient is zero or non-zero has three sets of context models, and the set of context models selected for a particular SIG depends on the quantizer used for the associated coefficient. Therefore, when starting to decode the SIG of a current coefficient, the entropy decoder (e.g., entropy decoding unit of video decoder 300) should know the parity of the coefficient in the previous scanning position, which determines the quantizer for the current coefficient and thus the context set for the SIG for that coefficient.

A TU is divided into non-overlapped subblocks, called coding groups (CGs), of which the size is usually 4×4. The decoding process described herein may at times be described with respect to a 4×4 CG but can easily be extended to any other CG sizes. This disclosure describes techniques related to the encoding and decoding processes for the absolute level of a coefficient in a CG. Other information associated with a CG, such as signs, may be encoded or decoded in the manner described in JVET-L0274 but may also be encoded and decoded using alternate techniques.

Video encoder 200 and video decoder 300 may be configured to process syntax elements in bitstreams. For example, the following syntax elements may be used to represent an absolute level value (absLevel) for a coefficient.

sig_coeff_flag: This flag is equal to 0, if absLevel is 0; otherwise, the flag is equal to 1.

abs_level_gt1_flag: The flag is present in bitstream, if sig_coeff_flag is equal to 1. It is equal to 1, if absLevel is greater than 1; otherwise, the flag is equal to 0.

par_level_flag: The flag is present in bitstream, if rem_abs_gt1_flag is equal to 1. It is equal to 0, if absLevel is an odd number, and is equal to 1, if absLevel is an even number.

abs_level_gt3_flag: The flag is present in bitstream, if abs_level_gt1_flag is equal to 1. It is equal to 1, if absLevel is greater than 3; otherwise, the flag is equal to 0.

abs_remainder: This syntax element is present in bitstream, if abs_level_gt3_flag is equal to 1. It is the remaining absolute value of a transform coefficient level that is coded with Golomb-Rice code abs_level: This is the absolute value of a transform coefficient level that is coded with Golomb-Rice code.

Below, the syntax elements sig_coeff_flag, par_level_flag, abs_level_gt1_flag, abs_level_gt3_flag, abs_remainder, and abs_level are denoted as SIG, Par, Gt1, Gt2, remLevel, absLevel, respectively, for the simplicity of description.

Video encoder 200 and video decoder 300 may be configured to set any of the above syntax elements that are not parsed from bitstream to a default value, such as 0. Given the values of the first of the five syntax elements, a value for the absolute level of a coefficient can be calculated as:

$$\text{absoluteLevel} = \text{SIG} + \text{Gt1} + \text{Par} + (\text{Gt2} \ll 1) + (\text{remLevel} \ll 1) \quad (1)$$

Alternatively, if the coefficient is coded entirely in bypass coded mode, then absoluteLevel may be directly coded as abs_level.

Figure 3:
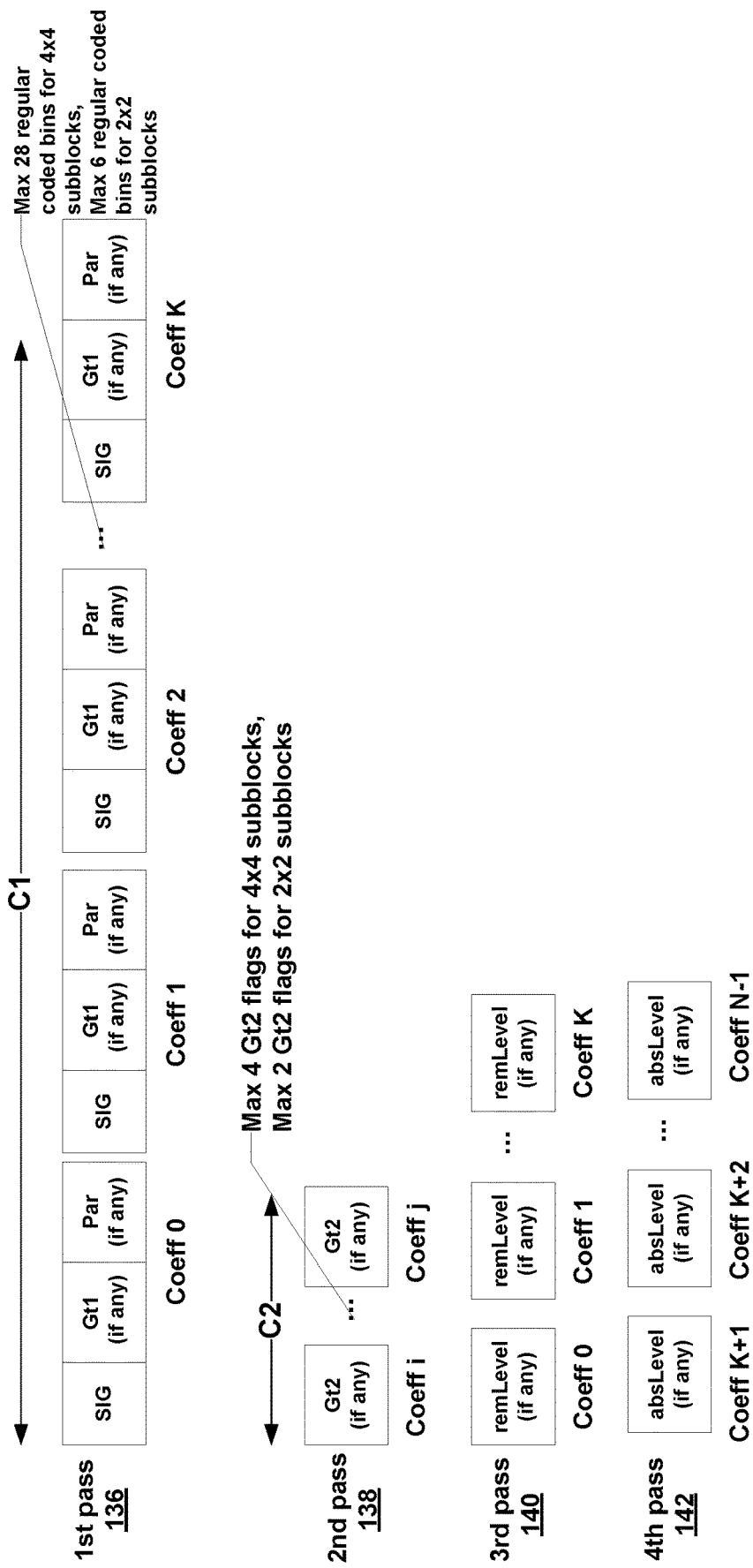
FIG. 3 shows an example order for the syntax elements representing absolute level values for coefficients in a coding group (CG).

FIG. 3 shows an example order for the syntax elements representing absoluteLevels in a CG as in JVET-L0274. Other orders may also be used. As can be seen, all the five syntax elements are parsed from bitstream, when absLevel is greater than 4.

In the example of FIG. 3, video decoder 300 scans the positions in a CG in up to four passes. In the first pass 136, video decoder 300 parses values for SIGs, Pars, and Gt1s. Only non-zero SIGs are followed by the corresponding Gt1s and Pars. That is, if video decoder 300 determines that a SIG has a value of zero, meaning a coefficient level is equal to zero, then video decoder 300 does not receive instances of Gt1 and par for that coefficient. After the first pass 136, a value for the partial absoluteLevel, denoted as absLevel1, for each position may be reconstructed, as shown in equation (2).

$$\text{absLevel1} = \text{SIG} + \text{Par} + \text{Gt1} \quad (2)$$

In some implementations, video decoder 300 may be configured to parse a maximum of 28 regular coded bins in the first pass 136 for 4×4 subblocks and a maximum of 6 regular coded bins for 2×2 subblocks. The limits for the number of regular coded bins may be enforced in groups of SIG, Gt1, Par bins, meaning that each group of SIG, Gt1, and Par bins is coded as a set and that switching to bypass coding in the middle of a set is not allowed.

If there is at least one non-zero Gt1 in the first pass, then video decoder 300 may be configured to scan a second pass 138. In the second pass 138, video decoder 300 parses Gt2s for the positions with non-zero Gt1s. The bins in first pass 136 and second passes 138 may all be regular coded, meaning the probability distribution of the bin is modeled by a selected context model. If there is at least one non-zero Gt2 in the second pass 138, then video decoder 300 scans a third pass 140. During the third pass 140, video decoder 300 parses the remLevels of the positions with non-zero Gt2s. A remLevel is not binary, and video decoder 300 may bypass-code the bins of the binarized version of a rem, meaning the bins are assumed to be uniformly distributed and no context selection is needed.

In the fourth pass 142, video decoder 300 scans all remaining coefficients, not represented partially with regular coded bins in the previous three passes. The coefficients levels of further pass 142 are coded as absolute values using bypass coded bins.

Figure 4:
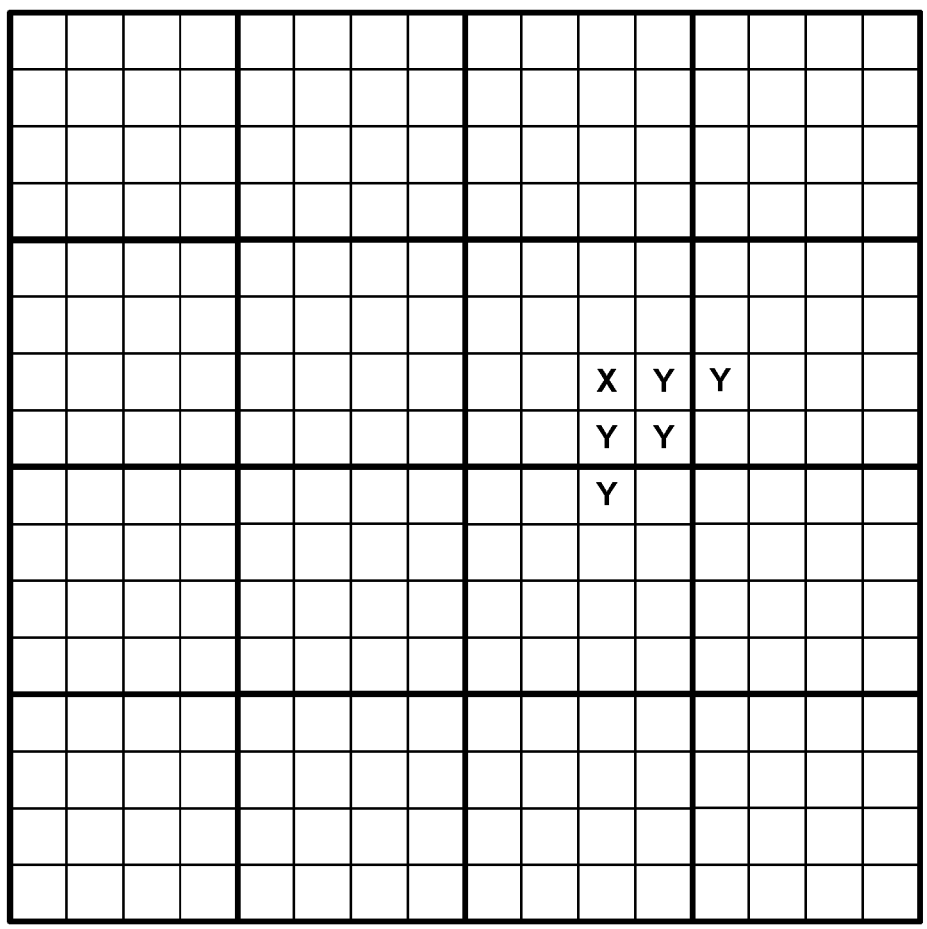
FIG. 4 shows an illustration of the template used for selecting probability models.

Video encoder 200 and video decoder 300 may perform context modelling. The context modelling used in JVET-L0274 is also briefly introduced here, along with modifications proposed by this disclosure. Context modelling, discussed in more detail below, generally refers to the selection of probability models, also referred to as contexts, for a bin-to-decode. In JVET-L0274, the syntax elements SIG, Par, Gt1, and Gt2 are coded using context modelling. The selection of a context depends on the values of absLevel is in a local neighborhood, denoted as N. FIG. 4 illustrates the template of the neighborhood used. That the positions inside the template, but outside the current TU, may be excluded from N.

FIG. 4 shows an illustration of the template used for selecting probability models. The square marked with an "X" specifies the current scan position, and the squares marked with a "Y" represent the local neighborhood used.

For the current position (see the square with the X in FIG. 4), video decoder 300 determines context indices of its SIG, Par, Gt1, and Gt2, denoted as ctxIdxSIG, ctxIdxPar, ctxIdxGt1, and ctxIdxGt2. To determine the context indices, video decoder 300 may first determine three variables—numSIG, sumAbs1, and d. The variable numSIG represents the number of non-zero SIGs in N, which is expressed by equation (3) below.

$$\text{sumSIG} = \Sigma_{i \in N} \text{SIG}(i) \quad (3)$$

The variable sumAbs1 represents the sum of absLevel in N, which is expressed by equation (4) below.

$$\text{sumAbs1} = \Sigma_{i \in N} \text{absLevel1}(i) \quad (4)$$

The variable d represents the diagonal measure of the current position inside a TU, as expressed by equation (5) below:

$$d = x + y \quad (5)$$

where x and y represent the coordinates of the current position inside TU.

Given sumAbs1 and d, video decoder 300 determines the context index for decoding SIG as follows:
For luma, ctxIdxSIG is determined by equation (6):

$$\text{ctxIdxSIG} = 18*\max(0,\text{state}-1) + \min(\text{sumAbs1},5) + (d<2?12:(d<5?6:0)) \quad (6)$$

For chroma, ctxIdxSIG is determined by equation (7):

$$\text{ctxIdxSIG} = 12*\max(0,\text{state}-1) + \min(\text{sumAbs1},5) + (d<2?6:0)) \quad (7)$$

In equations (6) and (7), the variable "state" represents the current state of the state machine as defined in JVET-L0274.

Given sumSIG, sumAbs1, and d, video decoder 300 determines the context index for decoding Par as follows:
If the current scan position is equal to the position of the last non-zero coefficient, ctxIdxPar is 0.
Otherwise,
For luma, ctxIdxPar is determined by equation (8):

$$\text{ctxIdxPar} = 1 + \min(\text{sumAbs1}-\text{numSIG},4) + (d==0?15: (d<3?10:(d<10?5:0))) \quad (8)$$

For chroma, ctxIdxPar is determined by (9)

$$\text{ctxIdxPar} = 1 + \min(\text{sumAbs1}-\text{numSIG},4) + (d==0?5:0) \quad (9)$$

ctxIdxGt1 and ctxIdxGt2 are set to the value of ctxIdxPar.

Video encoder 200 and video decoder 300 may be configured to perform RemLevel coding. Video decoder 300 derives the Rice Parameter (ricePar) for coding the non-binary syntax element remRemainder (remLevel) and absLevel as follows:

At the start of each subblock, ricePar is set equal to 0;
After coding a syntax element remainder, the Rice Parameter (ricePar) is modified as follows:
If ricePar is less than 3 and the last coded value of remainder is greater than ((3<<ricePar)-1), ricePar is incremented by 1.

For coding the non-binary syntax element absLevel, representing the absolute quantization indexes that are completely bypass-coded, the following applies:
The sum of absolute values sumAbs in a local template is determined.
The variables ricePar and posZero are determined by a table look-up according to ricePar=riceParTable[min (31, sumAbs)]
posZero=posZeroTable[max(0, state-1)][min(31, sumAbs)]
where the variable state represent the state for dependent quantization (it is equal to 0 when dependent quantization is disabled) and the tables riceParTable[ ] and posZeroTable[ ][ ] are given by

```
riceParTable[32] = {
    0,0,0,0,0,0,0,1,1,1,1,1,1,2,2,2,2,2,2,2,2,2,2,2,2,2,2,3,3,3,3
};
```

```
posZeroTable[3][32] = {
    {0,0,0,0,0,1,2,2,2,2,2,2,4,4,4,4,4,4,4,4,4,4,8,8,8,8,8,8,8,8},
    {1,1,1,1,2,3,4,4,4,6,6,6,8,8,8,8,8,8,12,12,12,12,12,12,12,12,16,16,16,16,16,16},
    {1,1,2,2,2,3,4,4,4,6,6,6,8,8,8,8,8,8,12,12,12,12,12,12,12,16,16,16,16,16,16,16}
};
```

The intermediate variable codeValue is derived as follows:
  If absLevel is equal to 0, codeValue is set equal to posZero;
  Otherwise, if absLevel is less than or equal to posZero, codeValue is set equal to absLevel−1;
  Otherwise (absLevel is greater than posZero), codeValue is set equal to absLevel.
The value of codeValue is coded using a Golomb-Rice code with Rice Parameter ricePar.

Video encoder 200 and video decoder 300 may be configured to perform absoluteLevel reconstruction. The absoluteLevel reconstruction may be the same as in JVET-L0274, which was discussed above with respect to the syntax elements in the bitstream.

Video encoder 200 and video decoder 300 may be configured to code Gt2 flags in an interleaved manner. In some examples, instead of the scheme described where in the first pass, SIG, Gt1, Par flags are coded and in the second pass, Gt2 flags are coded, the Gt2 flags can be incorporated into the first pass either after the Par flag or after the Gt1 flag as shown in figures below, reducing the coding passes to 3 from 4.

Figure 5:
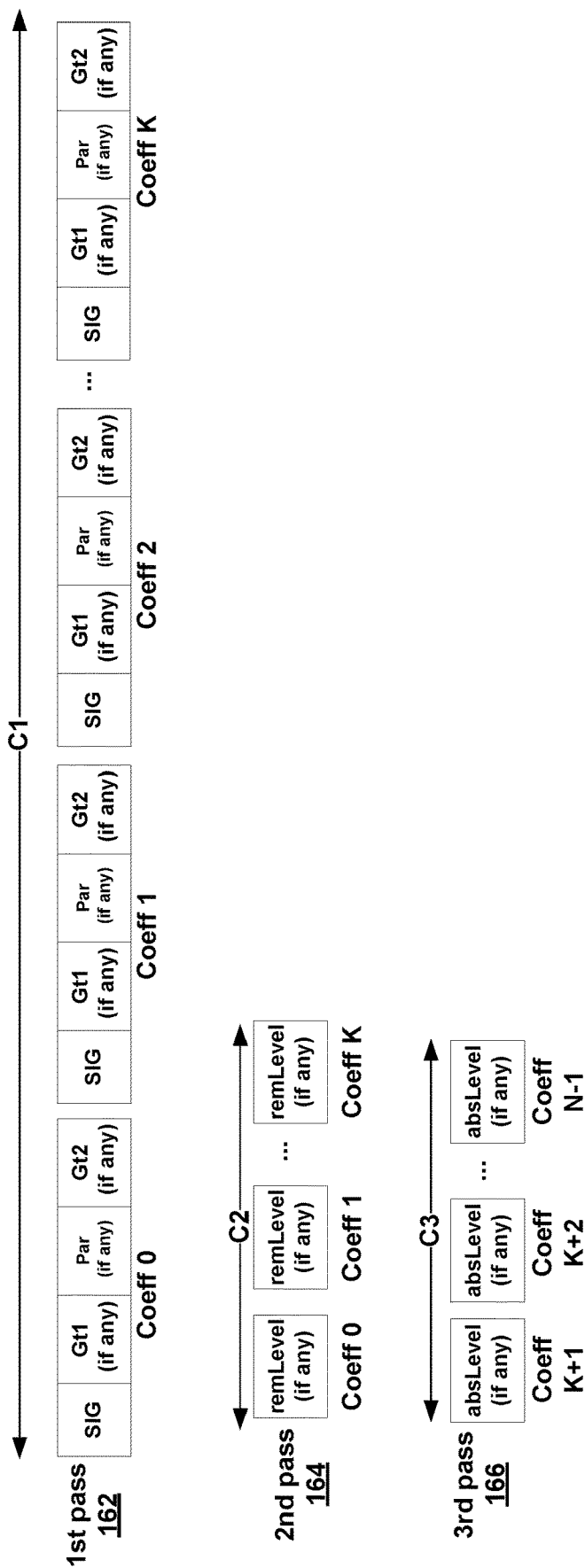
FIG. 5 shows an example of an interleaved Gt2 flag in the first pass after Par flag.

FIG. 5 shows an example of an interleaved Gt2 flag in the first pass after Par flag. With respect to FIG. 5, video decoder 300 may determine a value for absLevel1 in the same manner as described above with respect to FIG. 3, but the order in which the various syntax elements are received is changed. For example, in FIG. 5, video decoder 300 determines values for Gt2 as part of first pass 162 instead of as part of a second pass (e.g., second pass 138 in FIG. 3). Thus in FIG. 5, first pass 136 and second pass 138 of FIG. 3 are effectively combined into a single pass (first pass 162), and third pass 140 and fourth pass 142 of FIG. 3 become second pass 164 and third pass 166 of FIG. 5, respectively. Thus, in the example of FIG. 5, only three passes are needed to convey all syntax elements.

Figure 6:
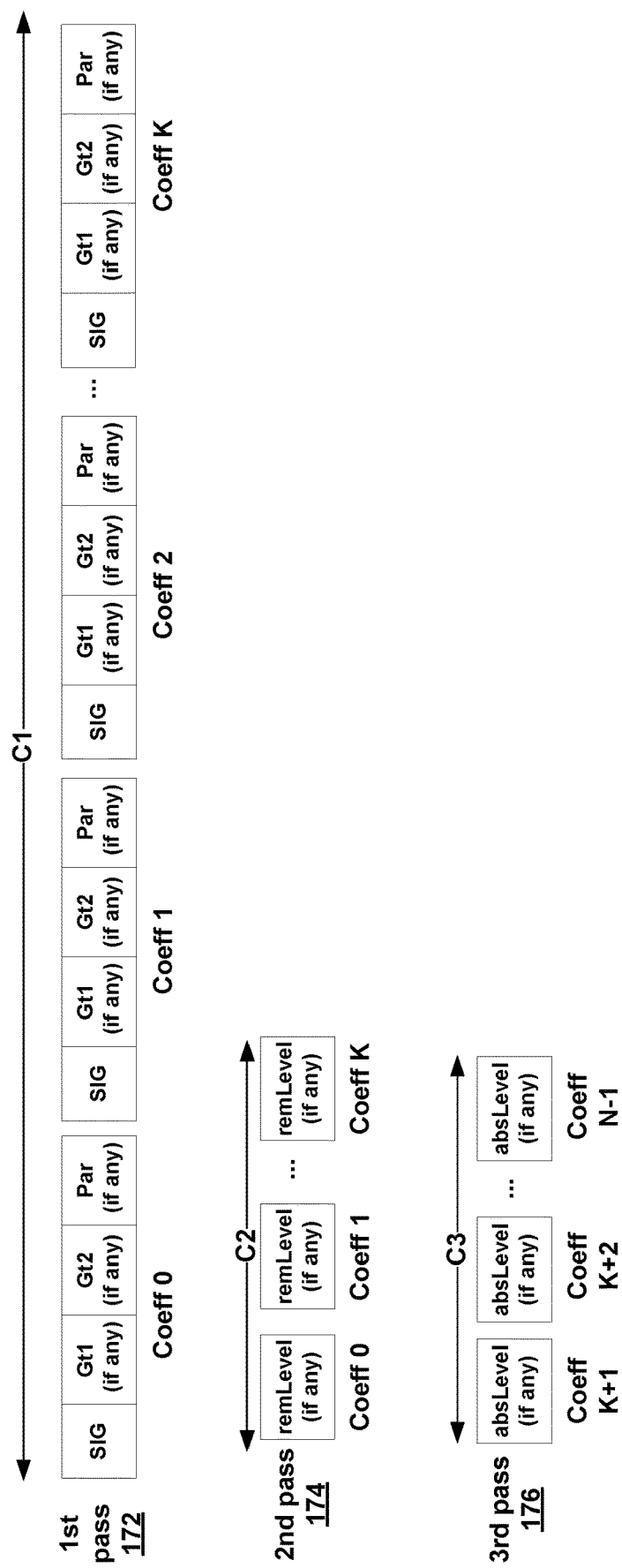
FIG. 6 shows an example of an Interleaved Gt2 flag in the first pass after Gt1 flag.

FIG. 6 shows an example of an Interleaved Gt2 flag in the first pass after Gt1 flag. In this case, absLevel1 can be computed as:

absLevel1=SIG+Par+Gt1+(Gt2<<1)

and can be used in context derivation in the formulas introduced above with respect to context modeling. With respect to FIG. 6, video decoder 300 may determine a value for absLevel1 in the same manner as described above with respect to FIG. 3, but the order in which the various syntax elements are received is changed. For example, in FIG. 6, video decoder 300 determines values for Gt2 as part of first pass 172 instead of as part of a second pass (e.g., second pass 138 in FIG. 3). Thus in FIG. 6, first pass 136 and second pass 138 of FIG. 3 are effectively combined into a single pass (first pass 172), and third pass 140 and fourth pass 142 of FIG. 3 become second pass 174 and third pass 176 of FIG. 6, respectively. Thus, in the example of FIG. 6, only three passes are needed to convey all syntax elements. In FIG. 6, the syntax elements of first pass 172 are scanned in a different order than the syntax elements of first pass 162 in FIG. 5, but the other passes are generally the same.

Video encoder 200 and video decoder 300 may be configured to utilize a partial last regular bin coded coefficient representation, where values for some coefficients may be partially conveyed using regular coded bins with a remainder value conveyed using bypass coding. In the coding scheme described in JVET-L0274, the last regular bin coded coefficient where a regular coded bin budget for a first coding pass is reached (e.g., Coeff K in FIG. 3), SIG, Gt1, Par bins are all coded as regular coded bins. Regular bin coding is not terminated in the middle of a SIG-Gt1-Par group. Similar to a SIG-Gt1-Par-Gt2 group or SIG-Gt1-Gt2-Par group (e.g., FIGS. 5 and 6), Coeff K's SIG, Gt1, Par, Gt2 flags are coded in regular mode. This disclosure proposes techniques for breaking this constraint by allowing possible termination of regular coded bins after coding of SIG and Gt1 flags as shown in FIGS. 7 and 8.

Figure 7:
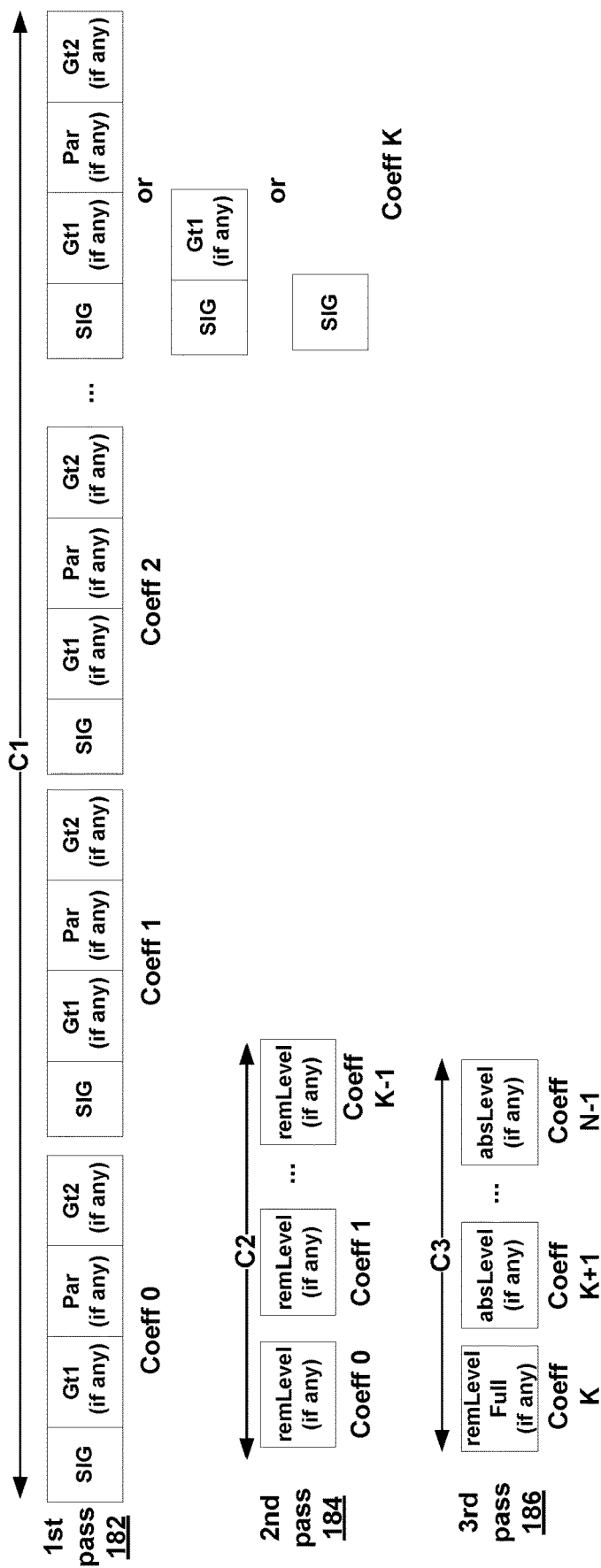
FIG. 7 shows an example of a partial coding of a last coefficient where a regular coded bin limit is reached for SIG-Gt1-Par-Gt2 coding in a first coding pass.

FIG. 7 shows an example of a partial coding of a last coefficient where a regular coded bin limit is reached for SIG-Gt1-Par-Gt2 coding in first coding pass 182. In the example of FIG. 7, video decoder 300 scans a third pass 186 that includes both remLevel values and absLevel values. A value for remLevel represents a remainder value between an actual value for a coefficient and a partial value determined from first pass 182 and second pass 184. A value for absLevel, in contrast, represents an absolute value of a coefficient value.

Figure 8:
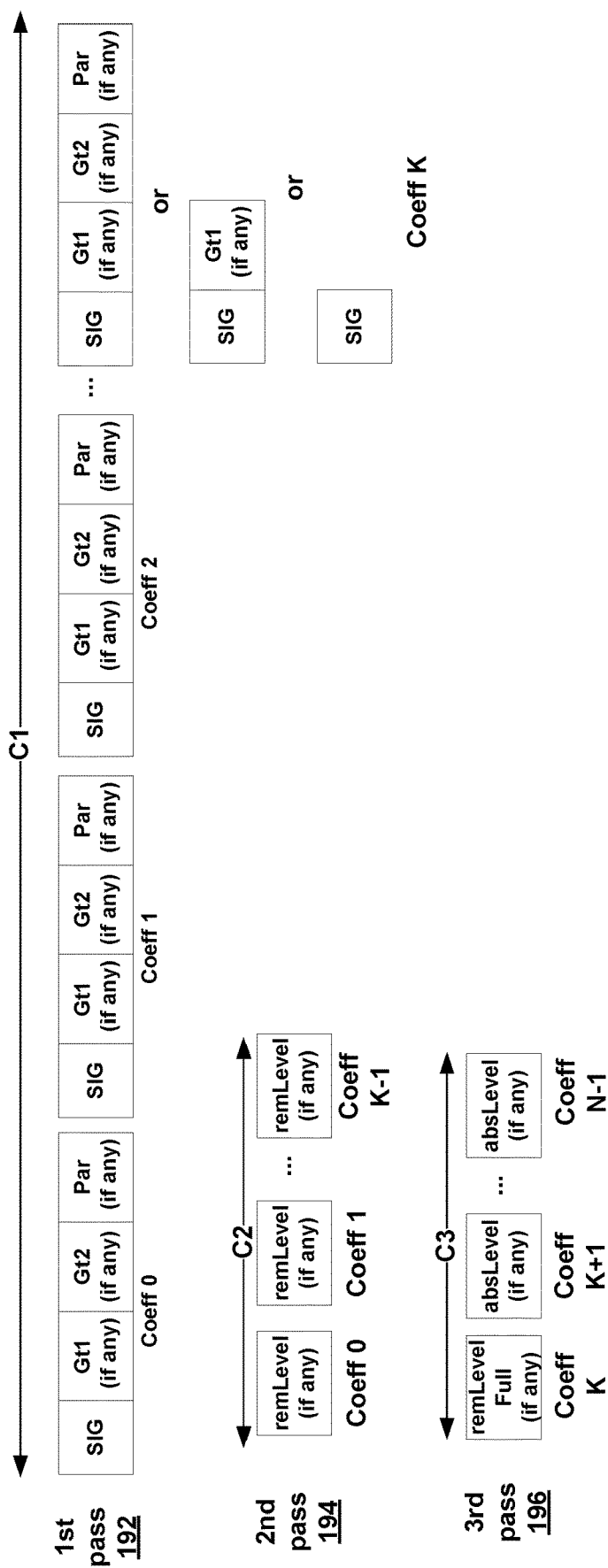
FIG. 8 shows an example of a partial coding of a last coefficient where a regular coded bin limit is reached for SIG-Gt1-Gt2-Par coding in a first coding pass.

FIG. 8 shows an example of a partial coding of a last coefficient where a regular coded bin limit is reached for SIG-Gt1-Gt2-Par coding in first coding pass 192. In FIG. 8, the syntax elements of first pass 192 are scanned in a different order than the syntax elements of first pass 182 in FIG. 7. Second pass 194 and third pass 196 are generally the same as second pass 184 and third pass 186 in FIG. 7.

In the examples of FIGS. 7 and 8, a remaining level of Coeff K is coded as remLevelFull, which is bypass coded, in third pass 186/196 along with values for absLevel, which are bypass coded. A value for a coefficient is represented as:

absoluteLevel=SIG+Gt1+remLevelFull, or absoluteLevel=SIG+remLevelFull.

In other examples, regular coding of bins can terminate after coding of Par and Gt2 flags, or vice versa. In this case remaining level of the last coefficient would get coded as half of the remaining level, i.e., absoluteLevel=SIG+GT1+Par+(remLevel<<1), or absoluteLevel=SIG+GT1+(GT2<<1)+(remLevel<<1).

The total number of regular coded bins may be specified as a total number that gets imposed on interleaved SIG, Gt1, Gt2 and Par flags.

Portions of this disclosure make reference to the following documents B. Bross, T. Nguyen, P. Keydel, H. Schwarz, D. Marpe, T. Wiegand, "Non-CE8: Unified Transform Type Signaling and Residual Coding for Transform Skip," JVET document JVET-M0464, Marrackech, M A, January 2019 (hereinafter JVET-M0464); M. Abdoli, G. Clare, F. Henry, P. Philippe, "AHG11: Block DPCM for Screen Content Coding," JVET document JVET-L0078, Macao, C N, October 2018 (hereinafter JVET-L0078); and F. Henry, M. Abdoli, P. Philippe, G. Clare, "CE8: BDPCM with horizontal/vertical predictor and independently decodable areas (test 8.3.1b)," JVET document JVET-M0057, Marrackech, M A, January 2019 (hereinafter JVET-M0057).

In video sequences in 4:4:4 color formats, such as the 4:4:4 YUV color format, sub-sampling is not applied to chroma components. As a result, compared to other formats with chroma sub-sampling, e.g. YUV 4:2:0 formats, chroma pictures are smoother, and chroma components are more correlated with the corresponding luma components. Such characteristics may be more apparent in sequences that include screen content. In JVET-M0464, techniques for transform skip coefficient coding were proposed to provide more coding efficiency for regular transform skip mode and BDPCM mode for screen content sequences. The techniques of JVET-M0464 mainly targeted coding efficiency for luma components. This disclosure proposes techniques that exploit the luma/chroma correlation for video in 4:4:4 color formats in both BDPCM prediction and transform skip coefficient coding.

JVET-L0078 and JVET-M0057 describe techniques for applying BDPCM mode only to luma components by exploiting the correlation between rows and columns vertical and horizontal BDPCM predictions. According to the techniques of this disclosure, BDPCM may be enabled for a chroma component in addition to a luma component. Video encoder 200 and video decoder 300 may, for example, determine a BDPCM mode, e.g., vertical mode or horizontal mode, for a luma component and use that same mode for chroma components, such than additional signaling of a BDPCM mode is not needed for the chroma components.

JVET-M0464 describes techniques where, in transform skip residual coding, a TU can be divided into multiple 4×4 coefficient groups. A flag sig_group_flag is signaled for each coefficient group indicating if the coefficient group has any non-zero coefficients after quantization. Instead of coding sig_group_flag for coefficient groups of Y, Cb and Cr components separately, video encoder 200 and video decoder 300 may be configured to signal a flag joint_sig_group_flag ahead of the flag sig_group_flag in the first component with a non-zero coefficient in the corresponding TU (i.e. Cbf=1). The value of joint_sig_group_flag may be determined by sig_group_flag of the CG in Y, Cb, and Cr components (denoted as sig_group_flag_Y, sig_groupflag_Cb, sig_group_flag_Cr) as follows:
joint_sig_group_flag=1 if sig_group_flag_Y=1 or sig_group_flag_Cb=1 or
sig_groupflag_Cr=1
joint_sig_group_flag=0 otherwise.

That is, video encoder 200 may encode and video decoder 300 may decode a joint significance flag for a residual block that indicates if at least one of a Cb coding group, a Cr coding group, or a Y coding group of the residual block includes at least one non-zero coefficient. If the joint significance flag indicates that at least one of the Cb coding group, the Cr coding group, or the Y coding group of the residual block includes at least one non-zero coefficient, then video encoder 200 may encode and video decoder 300 may decode additional, separate significance flags for each of the Cb coding group, the Cr coding group, or the Y coding group. If the joint significance flag indicates that none of the Cb coding group, the Cr coding group, or the Y coding group of the residual block includes at least one non-zero coefficient, then the additional, separate significance flags are not coded.

In some implementations, this approach may be applied only if there exist more than one color component with a coded block flag equal to one (i.e., Cbf>0) in the transform unit. Video encoder 200 and video decoder 300 may be configured to context code or bypass code the flag joint_sig_group_flag. The context can be shared with another context used in coefficient coding.

JVET-M0464 describes, for transform skip residual coding, techniques for coding coefficient absolute levels absCoeffLevel using sig_coeff_flag, abs_level_gtX_flags, par_level_flag, and abs_remainder value to form the final absolute transform coefficient value, where X can be 1, . . . , 5 (or some other cutoff value C). Video encoder 200 and video decoder 300 may be configured to determine absCoeffLevel as follows:

absCoeffLevel=1+abs_level_gt1_flag+par_level_flag+2*(abs_level_gt2_flag+abs_level_gt3_flag+ . . . +abs_level_gtC_flag)+2*abs_remainder.

According to techniques of this disclosure, instead of coding Y, Cb, and Cr coefficients separately, video encoder 200 and video decoder 300 may be configured to code a flag joint_sig_coeff_flag ahead of, in the bitstream, the flag sig_coeff_flag in the first component with non-zero coefficients in the corresponding CG (sig_group_flag>0). Video encoder 200 and video decoder 300 may be configured to determine the value of joint_sig_coeff_flag based on sig_coeff_flag of the CG in Y, Cb, and Cr components (denoted as sig_coeff_flag_Y, sig_coeff_flag_Cb, sig_coeff_flag_Cr) as follows:
joint_sig_coeff_flag=1 if sig_coeff_flag_Y=1 or sig_coeff_flag_Cb=1 or sig_coeff_flag_Cr=1
jointsig_coeff_flag=0 otherwise.

Video encoder 200 and video decoder 300 may be configured to context or bypass code the flag joint_sig_coeff_flag. The context can be shared with another context used in coefficient coding.

Figure 9:
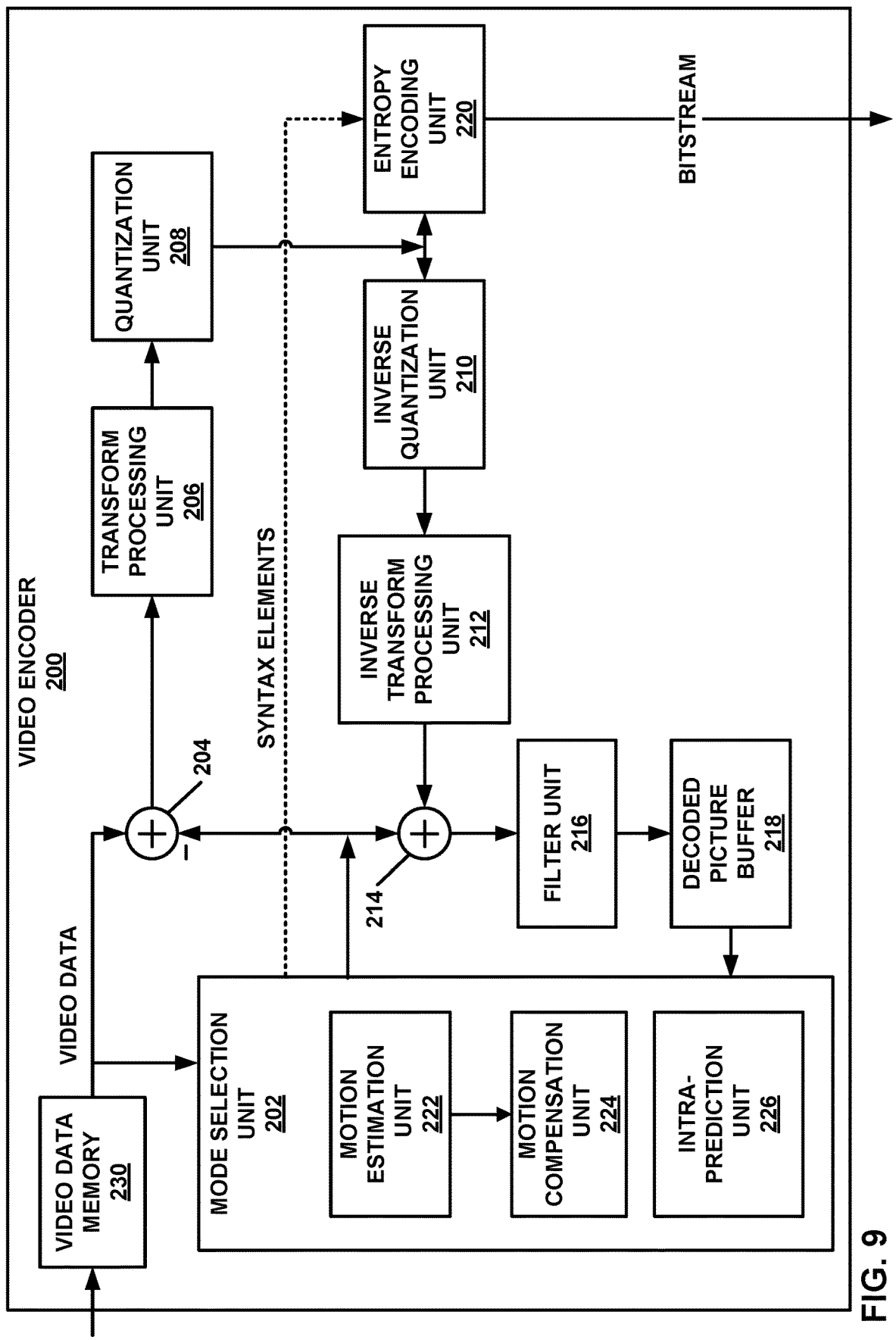
FIG. 9 is a block diagram illustrating an example video encoder that may perform the techniques of this disclosure.

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 9, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2NxnU, 2NxnD, nLx2N, and nRx2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block. For blocks coded in transform skip mode, transform processing unit 206 may be viewed as a pass-through unit that does not alter the residual block.

Quantization unit 208 may quantize the coefficients in a coefficient block, to produce a quantized coefficient block. Quantization unit 208 may quantize coefficients of a coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized coefficients may have lower precision than the original coefficients produced by transform processing unit 206.

Inverse quantization unit 210 and inverse transform processing unit 212 may apply inverse quantization and inverse transforms to a quantized coefficient block, respectively, to reconstruct a residual block from the coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

In this manner, video encoder 200 represents an example of a device for encoding video data that includes a memory configured to store video data and one or more processors implemented in circuitry and configured to determine a predictive block for a current block of the video data; and determine a residual block for the current block, wherein to determine the residual block for the current block, the one or more processors are configured to determine if at least one of a first chroma coding group (CG), a second chroma CG, or a luma CG of the residual block includes at least one non-zero coefficient and in response to none of the first chroma CG, the second chroma CG, or the luma CG including at least one non-zero coefficient, generate for inclusion in a bitstream of encoded video data, a syntax element indicating that none of the first chroma CG, the second chroma CG, or the luma CG include at least one non-zero coefficient.

Figure 10:
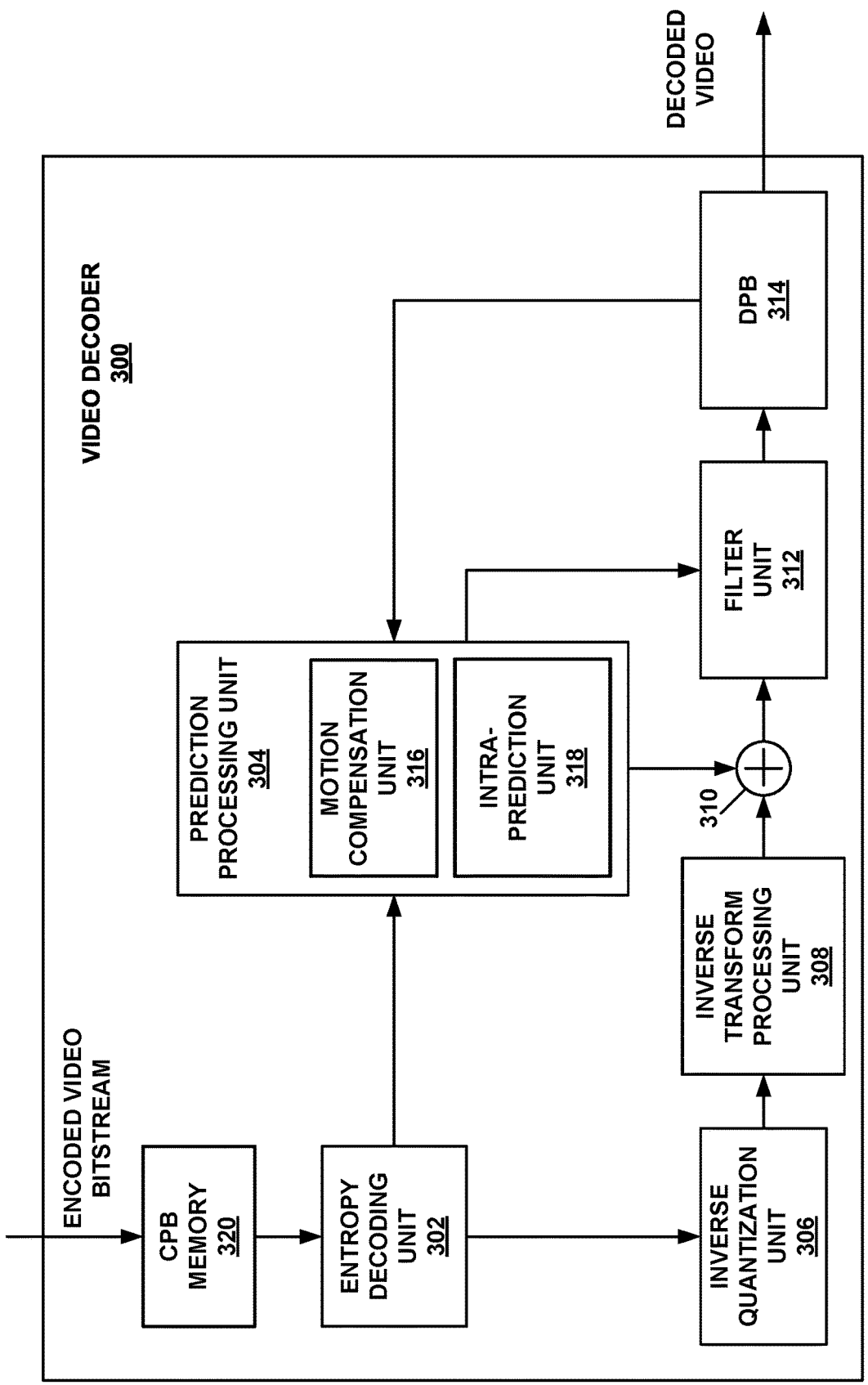
FIG. 10 is a block diagram illustrating an example video decoder that may perform the techniques of this disclosure.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized coefficients of a quantized coefficient block, as well as transform information, such as a quantization parameter (QP) and/or transform mode indication(s). Inverse quantization unit 306 may use the QP associated with the quantized coefficient block to determine a degree of quantization and, likewise, a degree of inverse quantization for inverse quantization unit 306 to apply. Inverse quantization unit 306 may, for example, perform a bitwise left-shift operation to inverse quantize the quantized coefficients. Inverse quantization unit 306 may thereby form a coefficient block including coefficients.

After inverse quantization unit 306 forms the coefficient block and if the coefficient block is a transform coefficient block, then inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data and one or more processing units implemented in circuitry and configured to determine a predictive block for a current block of the video data, determine a residual block for the current block, and add the predictive block to the residual block to determine a reconstructed block for the current block. As part of determining the residual block, the one or more processing units may be configured to receive a first syntax element indicating if at least one of a first chroma coding group, a second chroma coding group, or a luma coding group includes at least one non-zero coefficient; in response to the first syntax element indicating that at least one of the first chroma coding group, the second chroma coding group, or the luma coding group includes at least one non-zero coefficient, receive a first flag indicating if the first chroma coding group includes at least one non-zero coefficient, a second flag indicating if the second chroma coding group includes at least one non-zero coefficient, and a third flag indicating if the luma coding group includes at least one non-zero coefficient; and for at least one of the first chroma coding group, the second chroma coding group, or the luma coding group that has a corresponding flag indicating that the corresponding coding group includes at least one non-zero coefficient, receive additional syntax indicating values for coefficients of the corresponding coding group.

Figure 11:
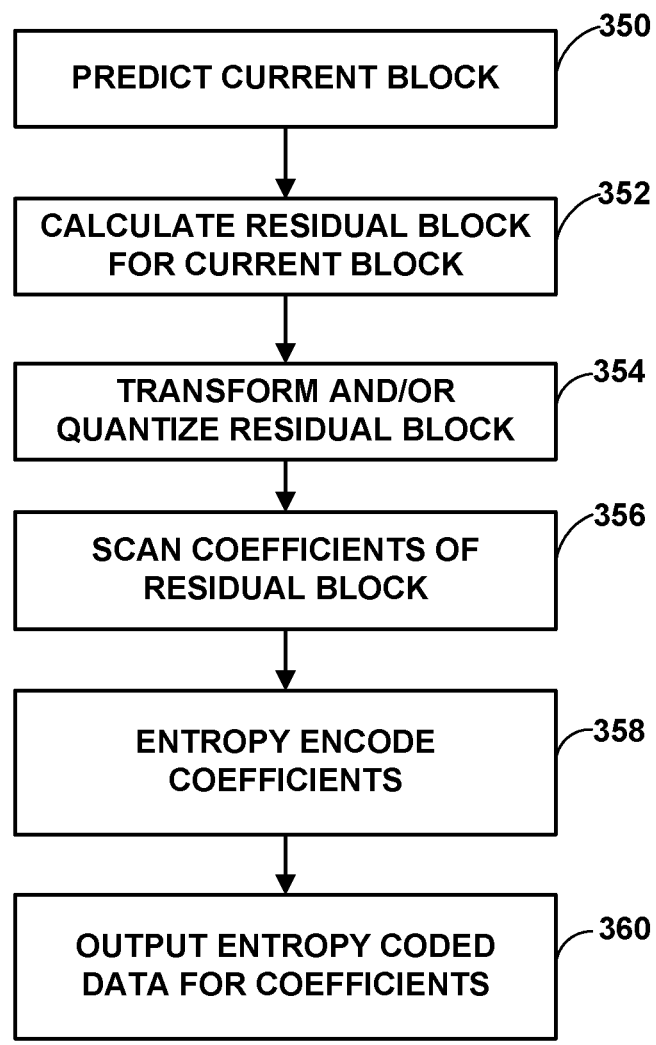
FIG. 11 is a flowchart illustrating an example video encoding process.

FIG. 11 is a flowchart illustrating an example method for encoding a current block. The current block may comprise a current CU. Although described with respect to video encoder 200 (FIGS. 1 and 9), it should be understood that other devices may be configured to perform a method similar to that of FIG. 11.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and/or quantize coefficients of the residual block (354). Next, video encoder 200 may scan the quantized coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 12:
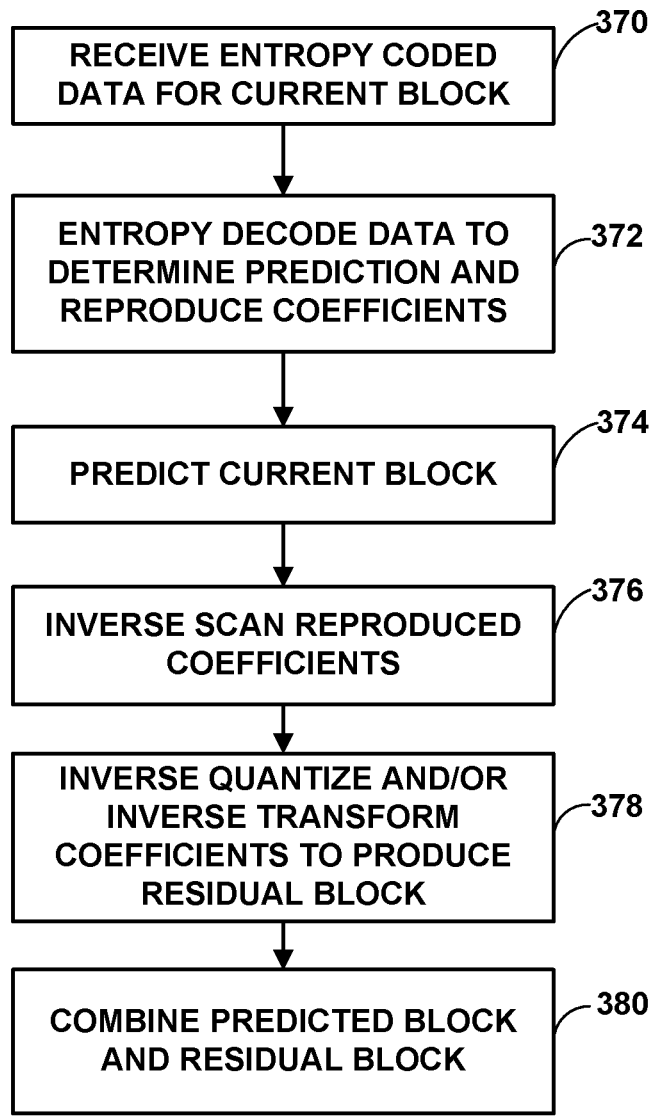
FIG. 12 is a flowchart illustrating an example video decoding process.
Figure 13:
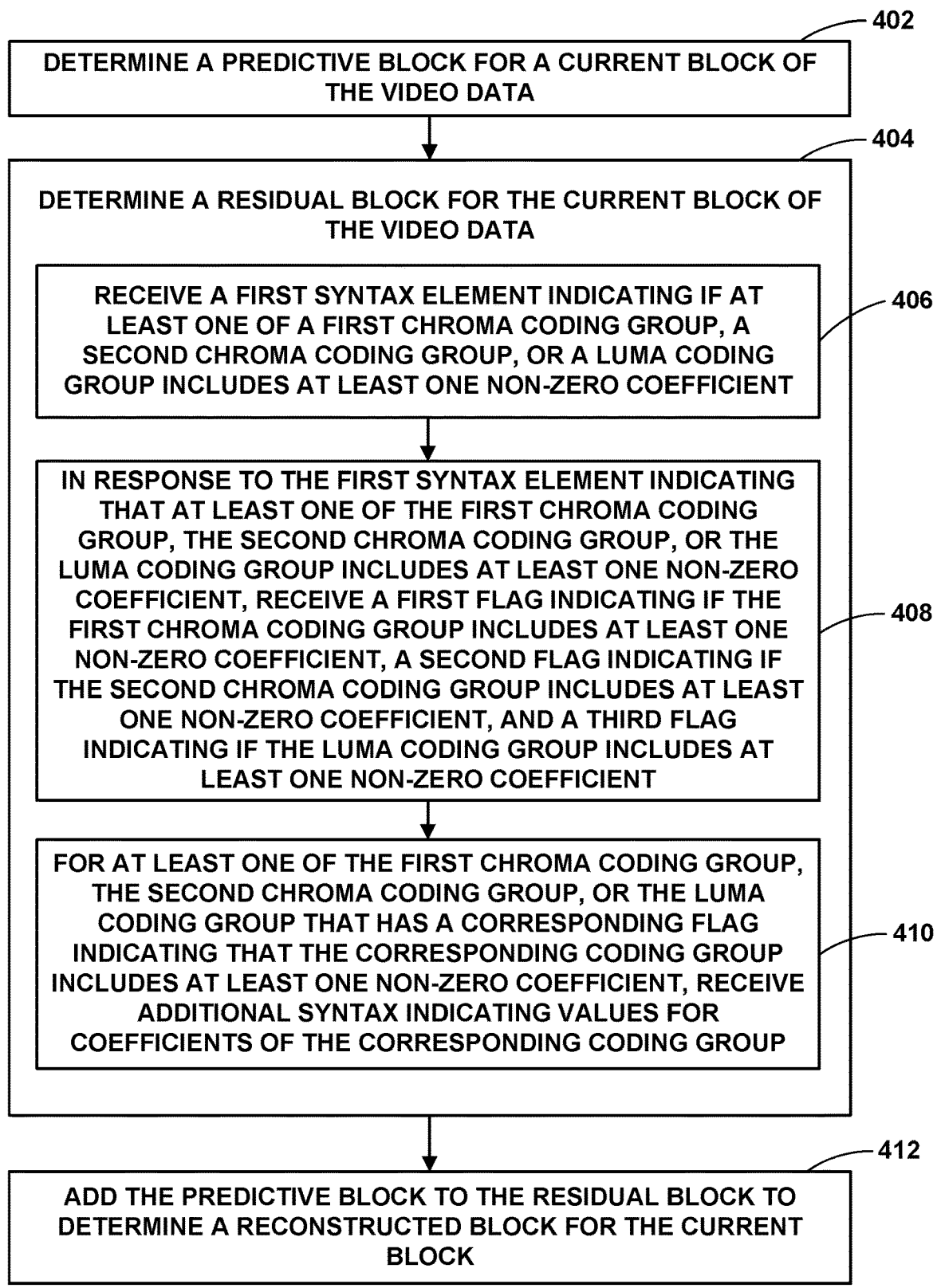
FIG. 13 is a flowchart illustrating an example video decoding process.

FIG. 12 is a flowchart illustrating an example method for decoding a current block of video data. The current block may comprise a current CU. Although described with respect to video decoder 300 (FIGS. 1 and 12), it should be understood that other devices may be configured to perform a method similar to that of FIG. 12.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder

300 may, for example, reproduce the coefficients in the various manners described herein. Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized coefficients. Video decoder 300 may then inverse quantize and/or inverse transform the coefficients to produce a residual block (378). Video decoder 300 may ultimately decode the current block by combining the prediction block and the residual block (380).

FIG. 10 is a flowchart illustrating an example process for decoding video data. Although described with respect to video decoder 300 (FIGS. 1 and 10), it should be understood that other devices may be configured to perform a process similar to that of FIG. 10.

Video decoder 300 determines a predictive block for a current block of the video data (402). Video decoder 300 may, for example, determine the predictive block using intra prediction, inter prediction, or other predictive techniques. Video decoder 300 determines a residual block for the current block (404). The residual block may, for example, be a coefficient group or a transform unit that includes multiple coefficient groups.

As part of determining the residual block, video decoder 300 receives a first syntax element indicating if at least one of a first chroma coding group, a second chroma coding group, or a luma coding group includes at least one non-zero coefficient (406). The luma coding group may, for example, be a 4×4 block of quantized luma residual values. The first chroma coding group may, for example, be a first 4×4 block of quantized chroma residual values, and the second chroma coding group may be a second 4×4 block of quantized chroma residual values. Video decoder 300 may, for example, receive the first syntax element indicating if at least one of the first chroma coding group, the second chroma coding group, or the luma coding group includes at least one non-zero coefficient in response to determining that a residual block comprising the first chroma coding group, the second chroma coding group, or the luma coding group is coded in a transform skip mode and/or in response to the video data being in a 4:4:4 color format. Video decoder 300 may, for example, receive the first syntax element by context decoding the first syntax element.

In response to the first syntax element indicating that at least one of the first chroma coding group, the second chroma coding group, or the luma coding group includes at least one non-zero coefficient, video decoder 300 receives a first flag indicating if the first chroma coding group includes at least one non-zero coefficient, a second flag indicating if the second chroma coding group includes at least one non-zero coefficient, and a third flag indicating if the luma coding group includes at least one non-zero coefficient (408).

For at least one of the first chroma coding group, the second chroma coding group, or the luma coding group that has a corresponding flag indicating that the corresponding coding group includes at least one non-zero coefficient, video decoder 300 receives additional syntax indicating values for coefficients of the corresponding coding group (410). The additional syntax elements may, for example, be any of the sig_coeff_flag, abs_level_gtX_flags, par_level_flag, abs_remainder, or other syntax elements described above.

After, or partially in parallel with, determining the residual block, video decoder 300 adds the predictive block to the residual block to determine a reconstructed block for the current block (412). Video decoder 300 may, for example, output the reconstructed block as part of decoded video. Video decoder 300 may output the video by displaying a picture with the reconstructed block, storing a picture with the reconstructed block for later display, and/or storing a picture with the reconstructed block for use in later decoding operations. In some examples, video decoder 300 may also perform one or more filtering operations on the reconstructed block and output a filtered version of the reconstructed block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that the video data is in a 4:4:4 color format;
   determining a predictive block for a current block of the video data;
   determining that a residual block for the current block is coded in a transform skip mode;
   determining the residual block for the current block, wherein determining the residual block for the current block comprises:
      in response to determining that the residual block for the current block is coded in a transform skip mode, receiving a first syntax element indicating if at least one of a first chroma coding group (CG) of the residual block, a second chroma CG of the residual block, or a luma CG of the residual block includes at least one non-zero coefficient;
      in response to the first syntax element indicating that at least one of the first chroma CG of the residual block, the second chroma CG of the residual block, or the luma CG of the residual block includes at least one non-zero coefficient, receiving a first flag indicating if the first chroma CG of the residual block includes at least one non-zero coefficient, a second flag indicating if the second chroma CG of the residual block includes at least one non-zero coefficient, and a third flag indicating if the luma CG of the residual block includes at least one non-zero coefficient;
      for at least one of the first chroma CG of the residual block, the second chroma CG of the residual block, or the luma CG of the residual block having at least one non-zero coefficient, receiving additional syntax indicating values for coefficients of the at least one of the first chroma CG of the residual block, the second chroma CG of the residual block, or the luma CG of the residual block having the at least one non-zero coefficient; and
   determining the residual block based on the values for the coefficients; and
   adding the predictive block to the residual block to determine a reconstructed block for the current block.

2. The method of claim 1, wherein the luma CG of the residual block comprises a 4×4 block of quantized luma residual values, the first chroma CG of the residual block comprises a first 4×4 block of quantized chroma residual values, and the second chroma CG of the residual block comprises a second 4×4 block of quantized chroma residual values.

3. The method of claim 1, wherein receiving the first syntax element comprises context decoding the first syntax element.

4. The method of claim 1, wherein the additional syntax comprises a plurality of significant coefficient flags indicating if a corresponding coefficient of the corresponding CG has an absolute level greater than 0.

5. The method of claim 1, wherein the additional syntax comprises an absolute level greater than one flag indicating if a coefficient of the corresponding CG has an absolute level greater than 1.

6. The method of claim 1, wherein the additional syntax comprises a parity level flag indicating if a coefficient of the corresponding CG has an odd level or an even level.

7. The method of claim 1, wherein the additional syntax comprises an absolute level greater than three flag indicating if a coefficient of the corresponding CG has an absolute level greater than 3.

8. A device for decoding video data, the device comprising:
   a memory configured to store video data; and
   one or more processors implemented in circuitry and configured to:
      determine that the video data is in a 4:4:4 color format;
      determine a predictive block for a current block of the video data;
      determine that a residual block for the current block is coded in a transform skip mode;
      determine the residual block for the current block, wherein to determine the residual block for the current block, the one or more processors are configured to:
         in response to determining that the residual block for the current block is coded in a transform skip mode, receive a first syntax element indicating if at least one of a first chroma coding group (CG) of the residual block, a second chroma CG of the residual block, or a luma CG of the residual block includes at least one non-zero coefficient;
         in response to the first syntax element indicating that at least one of the first chroma CG of the residual block, the second chroma CG of the residual block, or the luma CG of the residual block includes at least one non-zero coefficient, receive a first flag indicating if the first chroma CG of the residual block includes at least one non-zero coefficient, a second flag indicating if the second chroma CG of the residual block includes at least one non-zero coefficient, and a third flag indicating if the luma CG of the residual block includes at least one non-zero coefficient; and
         for at least one of the first chroma CG of the residual block, the second chroma CG of the residual block, or the luma CG of the residual block having at least one non-zero coefficient, receive additional syntax indicating values for coefficients of the at least one of the first chroma CG of the residual block, the second chroma CG of the residual block, or the luma CG of the residual block having the at least one non-zero coefficient;

determine the residual block based on the values for the coefficients; and add the predictive block to the residual block to determine a reconstructed block for the current block.

9. The device of claim 8, wherein the luma CG of the residual block comprises a 4×4 block of quantized luma residual values, the first chroma CG of the residual block comprises a first 4×4 block of quantized chroma residual values, and the second chroma CG of the residual block comprises a second 4×4 block of quantized chroma residual values.

10. The device of claim 8, wherein receiving the first syntax element comprises context decoding the first syntax element.

11. The device of claim 8, wherein the additional syntax comprises a plurality of significant coefficient flags indicating if a corresponding coefficient of the corresponding CG has an absolute level greater than 0.

12. The device of claim 8, wherein the additional syntax comprises an absolute level greater than one flag indicating if a coefficient of the corresponding CG has an absolute level greater than 1.

13. The device of claim 8, wherein the additional syntax comprises a parity level flag indicating if a coefficient of the corresponding CG has an odd level or an even level.

14. The device of claim 8, wherein the additional syntax comprises an absolute level greater than three flag indicating if a coefficient of the corresponding CG has an absolute level greater than 3.

15. The device of claim 8, further comprising:
a display configured to display decoded video data.

16. The device of claim 8, wherein the device comprises:
one or more of a camera, a computer, a mobile device, a broadcast receiver device, or a set-top box.

17. A computer readable storage medium storing instructions that when executed by one or more processors cause the one or more processors to:
determine that the video data is in a 4:4:4 color format;
determine a predictive block for a current block of the video data;
determine that a residual block for the current block is coded in a transform skip mode;
determine the residual block for the current block, wherein to determine the residual block for the current block, the instructions cause the one or more processors to:
in response to determining that the residual block for the current block is coded in a transform skip mode, receive a first syntax element indicating if at least one of a first chroma coding group (CG) of the residual block, a second chroma CG of the residual block, or a luma CG of the residual block of the residual block includes at least one non-zero coefficient;
in response to the first syntax element indicating that at least one of the first chroma CG of the residual block, the second chroma CG of the residual block, or the luma CG of the residual block includes at least one non-zero coefficient, receive a first flag indicating if the first chroma CG of the residual block includes at least one non-zero coefficient, a second flag indicating if the second chroma CG of the residual block includes at least one non-zero coefficient, and a third flag indicating if the luma CG of the residual block includes at least one non-zero coefficient; and
for at least one of the first chroma CG of the residual block, the second chroma CG of the residual block, or the luma CG of the residual block having at least one non-zero coefficient, receive additional syntax indicating values for coefficients of the at least one of the first chroma CG of the residual block, the second chroma CG of the residual block, or the luma CG of the residual block having the at least one non-zero coefficient;
determine the residual block based on the values for the coefficients; and
add the predictive block to the residual block to determine a reconstructed block for the current block.

18. The computer readable storage medium of claim 17, wherein the luma CG of the residual block comprises a 4×4 block of quantized luma residual values, the first chroma CG of the residual block comprises a first 4×4 block of quantized chroma residual values, and the second chroma CG of the residual block comprises a second 4×4 block of quantized chroma residual values.

19. The computer readable storage medium of claim 17, wherein to receive the first syntax element, the instructions cause the one or more processors to context decode the first syntax element.

20. The computer readable storage medium of claim 17, wherein the additional syntax comprises a plurality of significant coefficient flags indicating if a corresponding coefficient of the corresponding CG has an absolute level greater than 0.

21. The computer readable storage medium of claim 17, wherein the additional syntax comprises an absolute level greater than one flag indicating if a coefficient of the corresponding CG has an absolute level greater than 1.

22. The computer readable storage medium of claim 17, wherein the additional syntax comprises a parity level flag indicating if a coefficient of the corresponding CG has an odd level or an even level.

23. The computer readable storage medium of claim 17, wherein the additional syntax comprises an absolute level greater than three flag indicating if a coefficient of the corresponding CG has an absolute level greater than 3.

24. An apparatus for decoding video data, the apparatus comprising:
means for determining that the video data is in a 4:4:4 color format;
means for determining a predictive block for a current block of the video data;
means for determining that a residual block for the current block is coded in a transform skip mode;
means for determining the residual block for the current block, wherein the means for determining the residual block for the current block comprises:
means for receiving a first syntax element indicating if at least one of a first chroma coding group (CG) of the residual block, a second chroma CG of the residual block, or a luma CG of the residual block of the residual block includes at least one non-zero coefficient in response to determining that the residual block for the current block is coded in a transform skip mode;
means for receiving, in response to the first syntax element indicating that at least one of the first chroma CG of the residual block, the second chroma CG of the residual block, or the luma CG of the residual block includes at least one non-zero coefficient, a first flag indicating if the first chroma CG of the residual block includes at least one non-zero coefficient, a second flag indicating if the second chroma CG of the residual block includes at least one non-zero coefficient, and a third flag indicating if the luma CG of the residual block includes at least one non-zero coefficient;

means for receiving, for at least one of the first chroma CG of the residual block, the second chroma CG of the residual block, or the luma CG of the residual block having at least one non-zero coefficient, additional syntax indicating values for coefficients of the at least one of the first chroma CG of the residual block, the second chroma CG of the residual block, or the luma CG of the residual block having the at least one non-zero coefficient; and means for determining the residual block based on the values for the coefficients; and means for adding the predictive block to the residual block to determine a reconstructed block for the current block.

25. The method of claim 1, wherein the predictive block is a first predictive block, the current block is a first current block, and the residual block is a first residual block, the method further comprising:

determining a second predictive block for a second current block of the video data;

determining that a second residual block for the second current block is coded in the transform skip mode;

determining the second residual block for the second current block, wherein determining the second residual block for the second current block comprises:

in response to determining that the second residual block for the current block is coded in the transform skip mode, receiving a second instance of the first syntax element indicating if at least one of a first CG of the second residual block, a second chroma CG of the second residual block, or a luma CG of the second residual block includes at least one non-zero coefficient;

in response to the second instance of the first syntax element indicating that none one of the first chroma CG of the second residual block, the second chroma CG of the second residual block, or the luma CG of the second residual block includes at least one non-zero coefficient, setting all coefficient values for the first chroma CG of the second residual block, the second chroma CG of the second residual block, and the luma CG to zero of the second residual block to zero.

26. The device of claim 8, wherein the predictive block is a first predictive block, the current block is a first current block, and the residual block is a first residual block, wherein the one or more processors are further configured to:

determine a second predictive block for a second current block of the video data;

determine that a second residual block for the second current block is coded in the transform skip mode;

determine the second residual block for the second current block, wherein determining the second residual block for the second current block comprises:

in response to determining that the second residual block for the current block is coded in the transform skip mode, receive a second instance of the first syntax element indicating if at least one of a first CG of the second residual block, a second chroma CG of the second residual block, or a luma CG of the second residual block includes at least one non-zero coefficient;

in response to the second instance of the first syntax element indicating that none one of the first chroma CG of the second residual block, the second chroma CG of the second residual block, or the luma CG of the second residual block includes at least one non-zero coefficient, set all coefficient values for the first chroma CG of the second residual block, the second chroma CG of the second residual block, and the luma CG to zero of the second residual block to zero.

27. The computer readable storage medium of claim 17, wherein the predictive block is a first predictive block, the current block is a first current block, and the residual block is a first residual block, wherein the instructions further cause the one or more processors to:

determine a second predictive block for a second current block of the video data;

determine that a second residual block for the second current block is coded in the transform skip mode;

determine the second residual block for the second current block, wherein determining the second residual block for the second current block comprises:

in response to determining that the second residual block for the current block is coded in the transform skip mode, receive a second instance of the first syntax element indicating if at least one of a first CG of the second residual block, a second chroma CG of the second residual block, or a luma CG of the second residual block includes at least one non-zero coefficient;

in response to the second instance of the first syntax element indicating that none one of the first chroma CG of the second residual block, the second chroma CG of the second residual block, or the luma CG of the second residual block includes at least one non-zero coefficient, set all coefficient values for the first chroma CG of the second residual block, the second chroma CG of the second residual block, and the luma CG to zero of the second residual block to zero.

* * * * *